United States Patent [19]

Jutte et al.

[11] 4,098,476

[45] Jul. 4, 1978

[54] MECHANICAL SUPPORT

[75] Inventors: Herbert F. Jutte, Garden Grove; Charles J. Starkus, Malibu, both of Calif.

[73] Assignee: The United States of America as represented by the Secretary of the Army, Washington, D.C.

[21] Appl. No.: 804,411

[22] Filed: Jun. 7, 1977

[51] Int. Cl.² .................. F16B 4/00; G02B 23/16
[52] U.S. Cl. .................................... 248/1; 138/108; 248/49; 248/DIG. 1; 285/187; 350/82; 403/30
[58] Field of Search ............... 248/1, DIG. 1, 56, 49; 403/28, 29, 30, 273; 350/82, 251, 253; 138/112, 113, 108; 285/187; 29/447

[56] References Cited

U.S. PATENT DOCUMENTS

| 1,101,084 | 6/1914 | McCarty | 29/447 |
|---|---|---|---|
| 1,987,677 | 1/1935 | Glassford | 29/447 |
| 2,194,886 | 3/1940 | Dallenbach | 403/28 X |
| 2,272,210 | 2/1942 | King | 403/30 X |
| 2,864,634 | 12/1958 | Musser | 403/314 |
| 3,507,522 | 4/1970 | Froman et al. | 285/187 |
| 3,648,734 | 3/1972 | Waite et al. | 138/113 |
| 3,668,754 | 6/1972 | Boast | 29/447 X |
| 3,785,407 | 1/1974 | Waite et al. | 138/108 |
| 4,017,959 | 4/1977 | Fletcher et al. | 403/273 X |
| 4,030,047 | 6/1977 | Fletcher et al. | 350/253 X |

*Primary Examiner*—Rodney H. Bonck
*Attorney, Agent, or Firm*—William G. Gapcynski; Werten F. W. Bellamy; Harold W. Hilton

[57] ABSTRACT

A support which can be assembled and disassembled at room temperature and prevents translational and rotational motion at temperatures below room temperature. A truncated cone is located between an outer support housing and an inner housing which is to be supported. The narrow end of the cone is sized to fit over the inner housing and the wide end of the cone is sized to fit within the outer support housing. The cone is comprised of a material which has a higher thermal expansion coefficient than the inner housing.

4 Claims, 4 Drawing Figures

MECHANICAL SUPPORT

The invention described herein was made in the course of or under a contract or subcontract thereunder with the Department of the Army.

BACKGROUND OF THE INVENTION

1. Field of the Invention

This invention generally relates to support structures which are loose at room temperatures and provide no translation or rotational motion at cold temperatures. More specifically, it deals with a structure for use in cold optics which requires mechanically supporting a telescope inside an evacuated housing, the support thermally isolating the telescope from the ambient temperature of the housing.

2. Description of the Prior Art

The prior art discloses many types of supports used to compensate for environmental varying temperatures. For example, in large heat exchangers the temperature difference between the heat exchanger and the support structure varies greatly. The usual way of supporting such heat exchangers is by mounting them on a plurality of circumferentially spaced sliding pad type mountings which, in turn, rest directly on the support structure.

Another way of supporting a structure which is subject to thermal variations is described in British Pat. No. 1,239,323. Therein is shown a structure tailored to prevent expansion or contraction under varying thermal conditions. The structure accomplishes this by providing a support which has a plurality of members coupled together, the members being arranged with their lengths chosen so that their thermal contractions compensate for each other to minimize the overall thermal contraction.

Another type of support structure which is designed to compensate for thermal expansion is described in U.S. Pat. No. 3,606,979 which teaches an expandable support means. A movable mount interacts with a rigid mount circumferentially based about a support ring. Each movable mount includes a four bar linkage arrangement in which the top horizontal bar is connected to a support member. The movable mount compensates for the thermal contraction and expansion of the support members to permit the rigid mount to secure the support ring at varying temperatures.

With regard to telescope mounts, it is known that cone-shaped mounts can be used to support a telescope as disclosed in U.S. Pat. No. 2,864,634. Therein is disclosed a telescope mount which provides a pair of keys longitudinally moveable between the telescope and its support and tapered to force the telescope in and out of the support as the support is tightened.

SUMMARY OF THE INVENTION

The invention comprises a truncated titanium cone which is located between an outer support housing and a beryllium telescope. The narrow end of the cone is shaped to loosely fit over the telescope at room temperature. The wide end of the cone is shaped to be disposed within the support housing at room temperature. Since titanium has a larger coefficient of thermal expansion than beryllium, at cold temperatures the cone diameter contracts more quickly than the telescope diameter and eventually closes and interfaces with the beryllium telescope causing a union which prevents translational and rotational motion of the telescope.

It is the object of this invention to provide a novel support means for concentrically arranged members which can be assembled and disassembled at room termperature and will prevent translational and rotational motion at cold termperatures.

It is a further object of this invention to provide a support for a telescope which can be used inside an evacuated housing.

It is yet a further object of this invention to provide a support which thermally isolates a telescope from the outer support housing temperature.

BRIEF DESCRIPTION OF THE DRAWING

Other objects and features of this invention will become apparent to those skilled in the art by referring to the preferred embodiment described in the following specification and shown in the accompanying drawing in which.

DESCRIPTION OF THE PREFERRED EMBODIMENT

Figure 2:
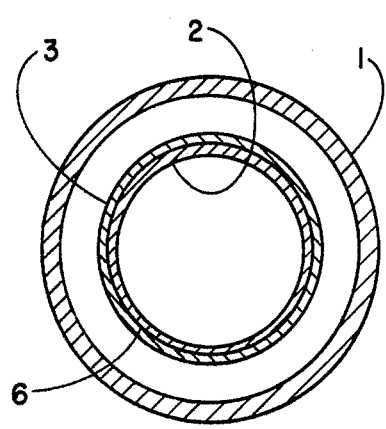
FIG. 2 is a transverse, cross-sectional view taken along lines 2—2 of FIG. 1.
Figure 1:
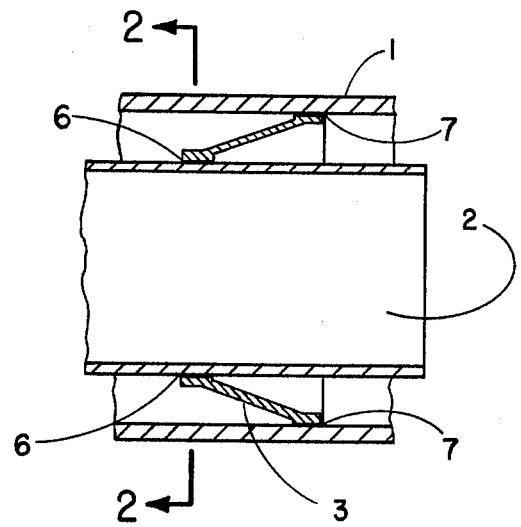
FIG. 1 is a longitudinal, cross-sectional view of the support located between the telescope and the housing.

Referring to the drawing, the outer support housing 1 generally surrounds the telescope 2 and provides a casing for the telescope 2. The housing is arranged so that it can be evacuated in order to thermally isolate the telescope 2 from the ambient temperature of the housing 1.

The support 3 surrounds the telescope 2 at point 6 and is connected to the housing 1 at point 7.

Figure 3:
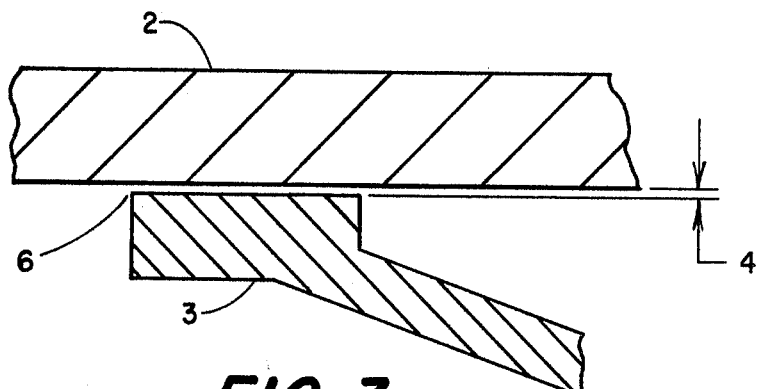
FIG. 3 is an enlarged fragmentary view of the point where the support meets the telescope at room temperature.
Figure 4:
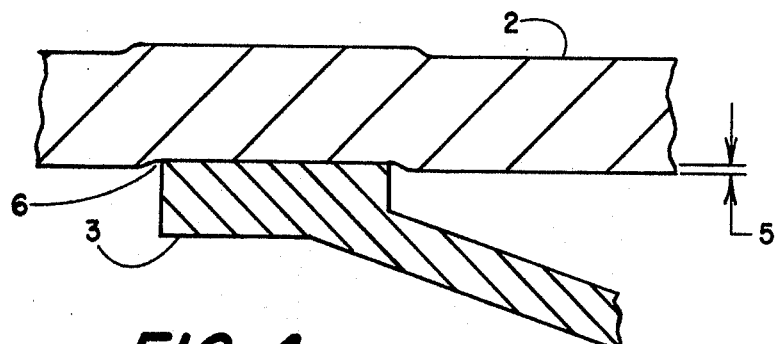
FIG. 4 is an enlarged fragmentory view of the point where the support meets the telescope at cold temperature, showing an exaggerated deformation of beryllium for clarity.

Referring to FIG. 3, at room temperature the radial clearance 4 provides sufficient clearance to allow easy assembly and disassembly of the titanium support 3 and the beryllium telescope 2. Referring to FIG. 4, at cold temperature, the coefficient of thermal expansion of the support 3 causes it to contract and close upon the telescope 2. Accordingly, a radial interference fit is created at interface 5. Proper sizing of the telescope 2 and of the support 3 will control the interference fit so that the static friction forces will prevent motion of the telescope within the support. Further, proper sizing will preclude damage to the telescope and to the support, which could occur if the interference were too great.

Generally, the support of this type is available for use in any type of cold optics system which requires assembly and disassembly at room temperatures and is tight at cold temperatures.

Although we have here described the preferred embodiment of my novel invention, many variations and modifications will now be apparent to those skilled in the art, and we therefore prefer to be limited, not by the specific disclosure herein, but only by the appending claims.

We claim:

1. A support apparatus which can be assembled and disassembled at a given temperature and which prevents rotational and translation motion at temperatures below the given temperature comprising:

a. a housing to be supported;
b. tapered support means having a narrow end and a wide end, and having a coefficient of thermal expansion which is greater than said housing;
c. an outer support means;
d. said narrow end of said tapered support means shaped to fit loosely around said housing; and
e. said wide end of said tapered support means secured to the outer support means, whereby responsive to said apparatus being exposed to temperatures below said given temperature the coefficient of thermal expansion of said tapered support means causes contraction thereof to provide a radial interference fit between said narrow end of said tapered support means and said housing.

2. The apparatus described in claim 1 wherein said housing comprises a beryllium telescope.

3. The apparatus as described in claim 1 wherein tapered support means is a truncated cone made of titanium.

4. The apparatus described in claim 1 wherein said given temperature is room temperature.

* * * * *